(12) United States Patent
Prakash et al.

(10) Patent No.: US 8,718,471 B2
(45) Date of Patent: May 6, 2014

(54) OPTICAL TRANSPORT NETWORK TRANSIENT MANAGEMENT SYSTEMS AND METHODS

(75) Inventors: Anurag Prakash, Noida (IN); Sebastien Gareau, Ottawa (CA); Alexander Gurd Young, Ottawa (CA); Gerald L. Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 110 days.

(21) Appl. No.: 13/476,589

(22) Filed: May 21, 2012

(65) Prior Publication Data

US 2013/0266312 A1    Oct. 10, 2013

(51) Int. Cl.
*H04J 14/00* (2006.01)
(52) U.S. Cl.
USPC ............................................ 398/58; 398/50
(58) Field of Classification Search
USPC .............................. 398/33, 47, 51, 58, 154, 50
See application file for complete search history.

(56) References Cited

U.S. PATENT DOCUMENTS

| | | | | |
|---|---|---|---|---|
| 7,463,626 B2 * | 12/2008 | Roy et al. | ........................ | 370/388 |
| 7,733,999 B2 * | 6/2010 | Mateosky et al. | .............. | 375/373 |
| 7,848,653 B2 | 12/2010 | Zou | | |
| 7,869,427 B2 * | 1/2011 | Best et al. | ........................ | 370/360 |
| 7,873,073 B2 | 1/2011 | Frlan et al. | | |
| 8,050,567 B2 | 11/2011 | Miller et al. | | |
| 8,059,685 B2 | 11/2011 | Ghodrat et al. | | |
| 2003/0123493 A1 | 7/2003 | Takahashi | | |
| 2005/0063700 A1 | 3/2005 | Shin et al. | | |
| 2007/0116061 A1 | 5/2007 | Meagher et al. | | |
| 2007/0264015 A1 * | 11/2007 | Li et al. | ............................ | 398/45 |
| 2007/0292129 A1 | 12/2007 | Yan et al. | | |
| 2008/0080860 A1 | 4/2008 | Katagiri | | |
| 2008/0219661 A1 | 9/2008 | Lanzone et al. | | |
| 2009/0086767 A1 | 4/2009 | Li | | |
| 2009/0257756 A1 | 10/2009 | Fukumitsu | | |
| 2010/0054731 A1 | 3/2010 | Oltman et al. | | |
| 2010/0098432 A1 | 4/2010 | Ono et al. | | |
| 2010/0172645 A1 | 7/2010 | Liu et al. | | |
| 2010/0226652 A1 | 9/2010 | Vissers et al. | | |
| 2010/0272438 A1 | 10/2010 | Conklin et al. | | |
| 2011/0200051 A1 | 8/2011 | Rivaud et al. | | |
| 2011/0243565 A1 | 10/2011 | Wolf | | |

OTHER PUBLICATIONS

Eurescom; "Enabling Generalized MPLS Control for G.709 Optical Transport Networks"; Papadimitriou Dimitri—ALCATEL; Eurescom—Oct. 2001.

Jing Wu and H.T. Mouftah; "Integrated Shim Layer"; Department of Electrical and Computer Engineering—Queens University—Ontario, Canada; (c)2000 Optical Society of America.

(Continued)

*Primary Examiner* — Dalzid Singh
(74) *Attorney, Agent, or Firm* — Clements Bernard PLLC; Christopher L. Bernard; Lawrence A. Baratta, Jr.

(57) ABSTRACT

An Optical Transport Network (OTN) transient management method, OTN node, and OTN network includes operating an OTN connection in a first mode in a network, the OTN connection traverses at least two nodes in the network, requesting a change in the OTN connection to a second mode which will cause a network transient, the change includes a timing change on the OTN connection affecting the at least two nodes, and performing transient management at the at least two nodes to mitigate the network transient, the transient management prevents spurious alarms due to the change between the first mode and the second mode.

20 Claims, 10 Drawing Sheets

(56) References Cited

OTHER PUBLICATIONS

Germano Gasparini, Gert Grammel, Dimitri Papadimitriou—Alcatel; Internet-Draft of "Traffic Engineering Extension to OSPF and ISIS for GMPLS Control of %.709 Optical Transport Networks"; Jun. 2002.
Presenter: Mike Jamgochian—Director of Business Development; Contributor: Steve Trowbridge—Standards Team, Optics CTO Group; Understanding OTN Optical Transport Network (G.709); Alcatel-Lucent—Mar. 9, 2010.
ITU-T G.709/Y.1331—Telecommunication Standardization Sector of ITU; Interfaces for the Optical Transport Network (OTN); International Telecommunication Union—Dec. 2009.
ITU-T G.8251—Telecommunication Standardization Sector of ITU; The control of jitter and wander within the optical transport network (OTN); International Telecommunication Union—Sep. 2010.

* cited by examiner

OPTICAL TRANSPORT NETWORK TRANSIENT MANAGEMENT SYSTEMS AND METHODS

CROSS-REFERENCE TO RELATED APPLICATION(S)

The present non-provisional patent claims the benefit of priority of co-pending Indian Patent Application No. 1073/DEL/2012, filed on Apr. 9, 2012, and entitled "OPTICAL TRANSPORT NETWORK TRANSIENT MANAGEMENT SYSTEMS AND METHODS," the contents of which are incorporated in full by reference herein.

FIELD OF THE INVENTION

Generally, the field of art of the present disclosure pertains to optical networking systems and methods, and more particularly, to Optical Transport Network (OTN) transient management systems and methods.

BACKGROUND OF THE INVENTION

Optical Transport Network (OTN) is defined by various standards to provide functionality of transport, multiplexing, switching, management, supervision and survivability of optical channels carrying client signals. Unlike OTN's predecessor Synchronous Optical Network (SONET) and Synchronous Digital Hierarchy (SDH), OTN was designed for support of optical networking using wavelength division multiplexing (WDM). OTN is defined in, for example, ITU-T Recommendation G.709 (December 2009) "Interfaces for the Optical Transport Network (OTN)", ITU-T Recommendation G.798 (October 2010) "Characteristics of optical transport network hierarchy equipment functional blocks", and ITU-T Recommendation G.8251 (September 2010) "The control of jitter and wander within the optical transport network (OTN)" the contents of each is incorporated by reference herein. Also unlike SONET/SDH, OTN does not distribute a network clock network wide. OTN started off as a point-to-point digital wrapper mainly for OAM&P and FEC purposes. OTN timing can come from two different un-synchronized clock sources, namely a shelf clock or from a client (i.e., line timing). Client clocking is used when the client consumes the whole payload and configuration allows OTN to be bit synchronous to client. Shelf timing is used when an OTN line is created locally to a node and contains multiplexed structure.

Clock adjustments in an OTN context can be problematic. For example, clock adjustments can include switching between the shelf timing and line timing and vice versa. These adjustments can occur during mode changes on an OTN line, i.e. changing from low order (LO) Optical channel Data Unit level k (ODUk) to high order ODUk and vice versa. That is, mode changes can occur when switching between 1:1 mapped ODUk containers and multiplexed ODUk containers. Specifically, lines affected by such clock adjustments experience transient incoming alignment errors (IAE), out-of-frame (OOF), etc. Problematically, these transients travel across the network (end-to-end) as the client signal is switched into the line (or vice versa). As each line changes clock sources from shelf to line, each down-stream line experiences a small, but alarmed outage. For example, a last link of an n-hop connection could experience n IAEs. Backward paths receive indications of the forward path framing difficulties as consequent actions (BIAE) as well. Synchronous (SONET/SDH) networks do not suffer from this condition. If nothing is done, then users can experience spurious alarms when ODUk services are added. In addition to these transients creating IAE events, data path errors can also be experienced leading to link failures that lead to restoration events and/or failures in in-band messaging (i.e. GCC overhead corruption).

BRIEF SUMMARY OF THE INVENTION

In an exemplary embodiment, an OTN transient management method includes operating an OTN connection in a first mode in a network, wherein the OTN connection traverses at least two nodes in the network; requesting a change in the OTN connection to a second mode which will cause a network transient, wherein the change includes a timing change on the OTN connection affecting the at least two nodes; performing transient management at the at least two nodes to mitigate the network transient, wherein the transient management prevents spurious alarms due to the change between the first mode and the second mode. In another exemplary embodiment, an OTN node includes a plurality of ports; circuitry configured to perform OTN switching between the plurality of ports; a local clock; an OTN connection traversing the plurality of ports and the circuitry, wherein the OTN connection is configured in a first mode including a first timing source; and a transient management algorithm configured to mitigate transients associated with switching the OTN connection from the first mode to a second mode including a second timing source; wherein the local clock includes one of the first timing source and the second timing source. In yet another exemplary embodiment, an OTN network includes a plurality of nodes interconnected therebetween; an OTN connection traversing at least two nodes of the plurality of nodes, wherein the OTN connection is configured in a first mode including a first timing source; and a transient management algorithm configured to mitigate transients associated with switching the OTN connection from the first mode to a second mode including a second timing source; wherein the transient management algorithm includes at least one of slowing adapting timing changes between the first timing source and the second timing source at one of the at least two nodes and an adjacency protocol between each of the at least two nodes, wherein the adjacency protocol provides an orderly creation of cross connections for the OTN connection.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which:

FIG. 1 is a network diagram of an exemplary network with five interconnected nodes and a connection there between;

DETAILED DESCRIPTION OF THE INVENTION

In various exemplary embodiments, OTN transient management systems and methods are described. In an exemplary embodiment, the transient management systems and methods include a network element-based control algorithm for adjusting a network element's transmission clock to avoid network transients on an end-to-end OTN switched ODUk paths. Advantageously, the control algorithm mitigates spurious alarms or data path errors when an ODUk is added to the network with a corresponding Optical channel Transport Unit level k (OTUk) layer experiencing IAE and out of frame (OOF) errors. In another exemplary embodiment, the transient management systems and methods include a network-based algorithm manages the setup and teardown of ODUk connections (e.g., high order (HO) connections) on an end-to-end basis to prevent spurious alarms when an ODUk is added to the network.

Figure 1:
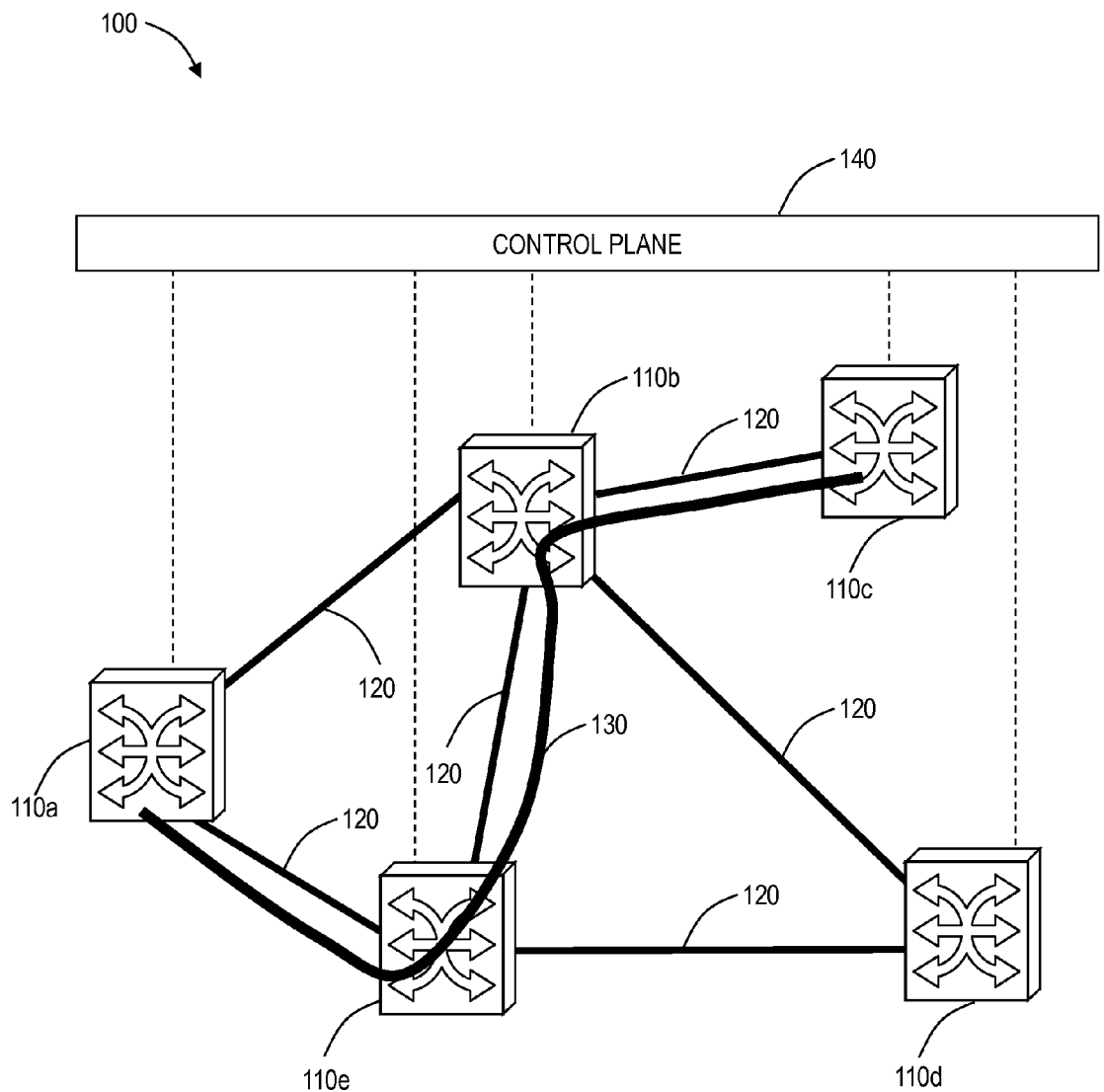
Figure 4:
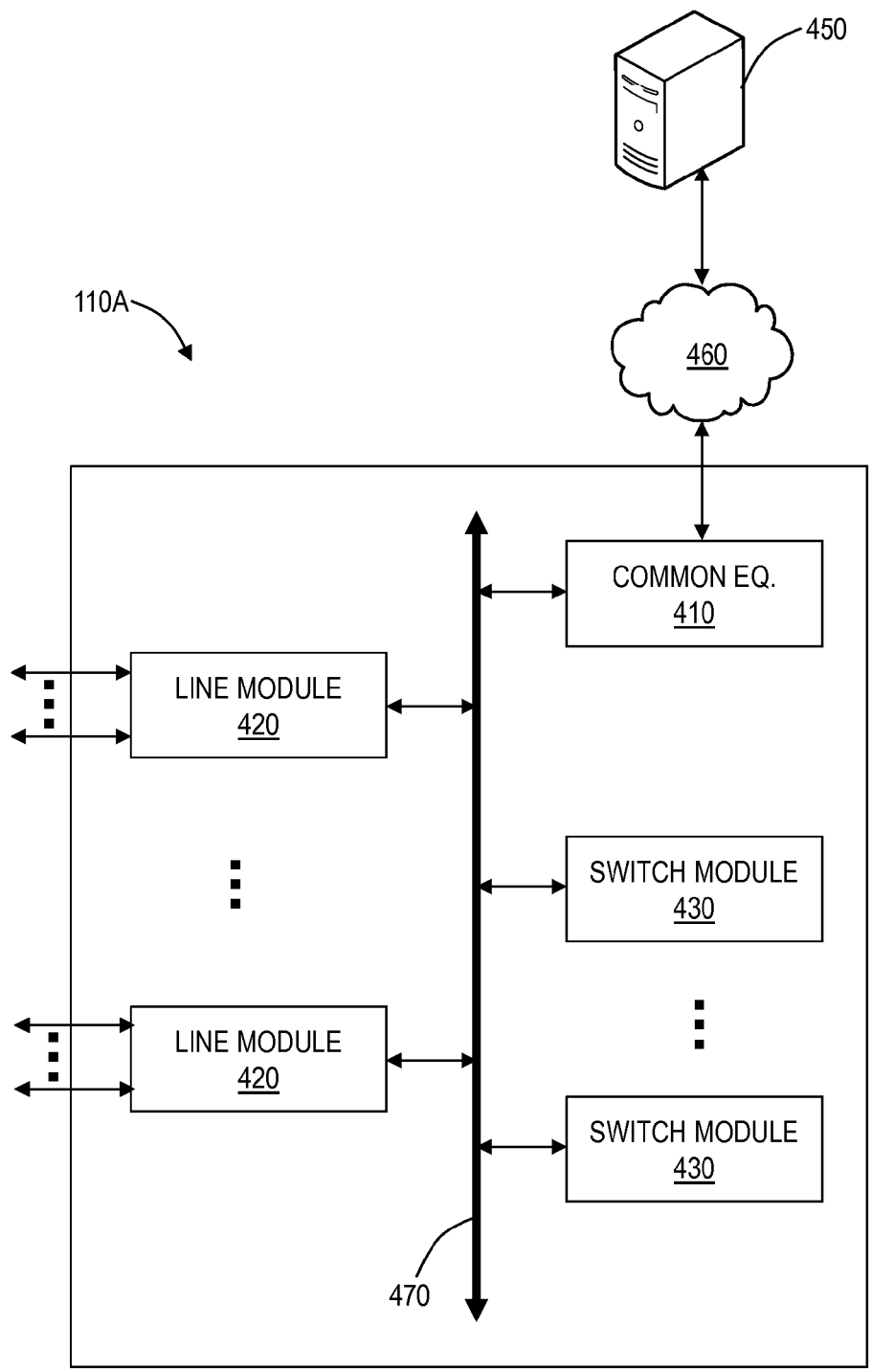
FIG. 4 is a block diagram of an exemplary node for the OTN transient management systems and methods.

Referring to FIG. 1, in an exemplary embodiment, a network diagram illustrates an exemplary network 100 with five interconnected nodes 110*a*, 110*b*, 110*c*, 110*d*, 110*e*. The nodes 110 are interconnected through a plurality of links 120. In an exemplary embodiment, the nodes 110 communicate with one another over the links 120 through OTN. The nodes 110 can be network elements which include a plurality of ingress and egress ports forming the links 120. An exemplary node 110A is illustrated in FIG. 4. The network 100 includes a connection 130 with ingress/egress at the nodes 110*a*, 110*c* and intermediate nodes 110*b*, 110*e*. The connection 130 can be an OTUk connection with an ODUk contained therein, k=0, 1, 2, 2e, 3, 3e2, 4, flex, etc. The connection 130 can be a subnetwork connection (SNC). The ODU can be a high order (HO) ODUk or a low order (LO) ODUj. The ODUk can be a high order (HO) ODUk or a low order (LO) ODUk. In the HO case, there is one to one container mapping, i.e. a client in the connection 130 takes the entire payload throughput of the connection 130, e.g. 10 GbE/OC-192/STM-64 into an ODU2. In this case, the an OTUk for the connection 130 needs framing to be derived from the HO ODUk contained therein as per OTN standards, i.e. the connection 130 receives timing from the client. In the LO case, the connection 130 is multiplexed from various clients such as an ODTUG Optical channel Data Tributary Unit Group (ODTUG), and the OTUk frame can be timed based on a local system clock for each of the nodes 110.

The network 100 can include a control plane 140 operating on and/or between the nodes 110*a*, 110*b*, 110*c*, 110*d*. The control plane 140 includes software, processes, algorithms, etc. that control configurable features of the network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like. In an exemplary embodiment, the control plane 140 can utilize Automatically Switched Optical Network (ASON) as defined in G.8080/Y.1304, Architecture for the automatically switched optical network (ASON) (Febuary 2005), the contents of which are herein incorporated by reference, and the like. In another exemplary embodiment, the control plane 140 can utilize Generalized Multi-Protocol Label Switching (GMPLS) Architecture as defined in Request for Comments: 3945 (October 2004), the contents of which are herein incorporated by reference, and the like. Also, the control plane 140 can utilize Resource Reservation Protocol (RSVP) as defined in Request for Comments: 2205 (September 1997). In yet another exemplary embodiment, the control plane 140 can utilize Optical Signaling and Routing Protocol (OSRP) from Ciena Corporation of Linthicum, Md. which is an optical routing protocol similar to PNNI (Private Network-to-Network Interface) and MPLS (Multiprotocol Label Switching). Those of ordinary skill in the art will recognize the network 100 and the control plane 140 can utilize any type control plane for controlling the nodes 110 and establishing connections therebetween. The transient management systems and methods can be implemented with and/or by the control plane or implemented separately.

The transient management systems and methods relate to transient prevention and mitigation during mode changes on the connection 130. As described herein, the mode changes can include switching between a multiplexed OTN connection, i.e. an ODTUG, to a non-multiplexed OTN connection, i.e. one-to-one container mapping, or vice versa. The mode change requires a clock transition, i.e. either from shelf clock timing to client timing or from client timing to shelf clock timing. For example, in an initial state, the connection 130 can be provisioned, but not have any client traffic contained therein. In an exemplary embodiment, the connection 130 can include ODTUGs, i.e. the connection 130 can be a multiplexed OTN connection with no clients provisioned on the TUGs. This is likely the default situation in most network deployments. In another exemplary embodiment, the connection 130 can include the one-to-one container mapping. As is the case in either of these exemplary embodiments, a mode changes occurs when there is a switch there between these different OTN modes. Variously, the transient management systems and methods are described herein to recognize a clock transition is occurring, reduce any clock transients, suppress spurious alarms, mitigate network-wide impact, and the like. Further, the transient management systems and methods can be utilized with the control plane 140 as an adjacency protocol underneath the control plane 140 or integrated therein. In addition to the aforementioned, the transient management systems and methods with the control plane 140 can avoid mesh restoration events due to the transients and prevent in-band messaging on any affected connections.

Figure 2:
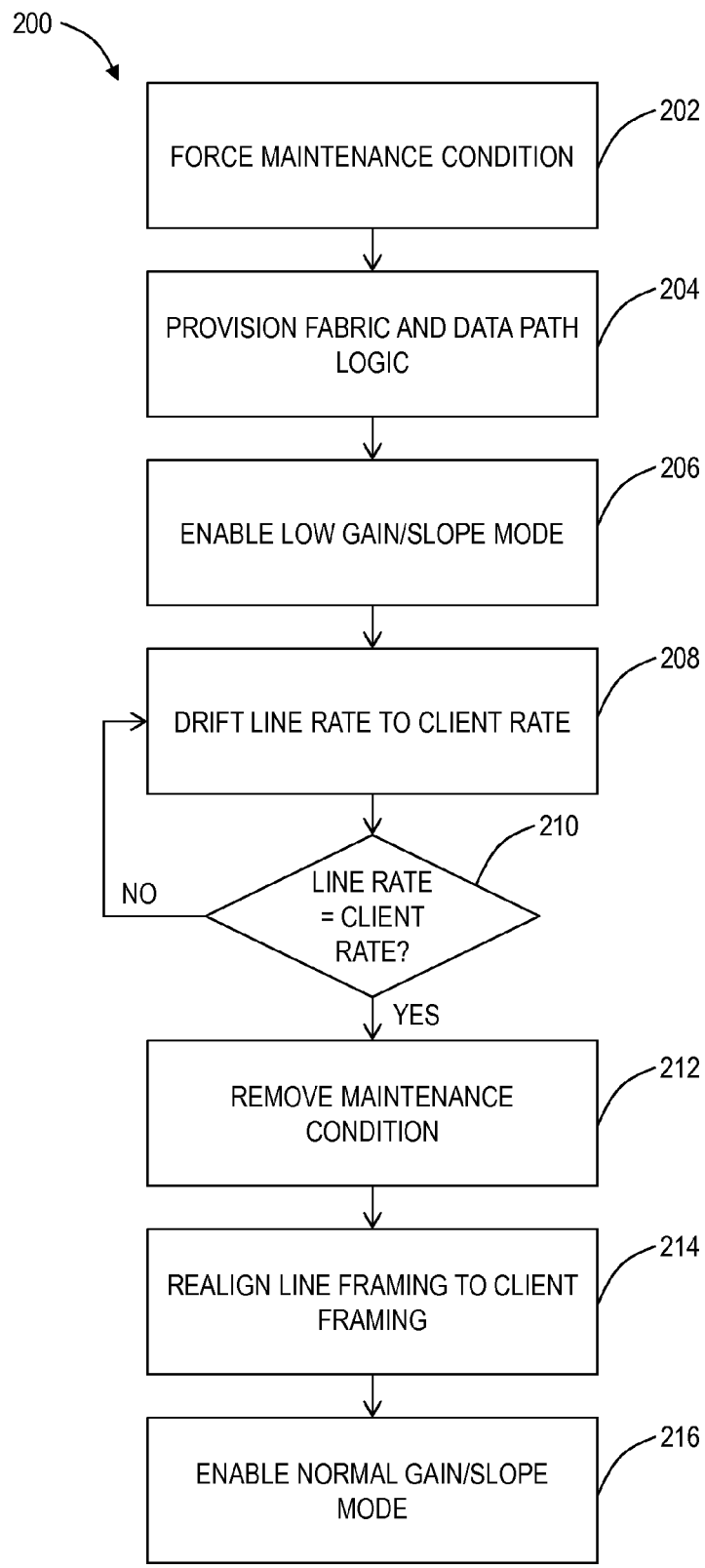
FIG. 2 is a flowchart of a network element-based method for adding an ODUk connection to a network with a clock transition.

Referring to FIG. 2, in an exemplary embodiment, a flowchart illustrates a network element-based method 200 for adding an ODUk connection to a network with a clock transition. Using the connection 130 as an example, the method 200 can be performed by the node 110*a* to mitigate transient effects at the nodes 110*e*, 110*b*, 110*c* associated with a clock transition on the connection 130. The method 200 generally inserts a clean maintenance signal on the connection 13 while slowly adjusting the clock at the network element 110*a* to avoid network transients (e.g., on the end-to-end OTN switched ODUk path of the connection 130). In effect, the method 200 prevents spurious alarms or data path errors when the ODUk is added to the network 100 with the OTUk layer only experiencing IAE and OOF. The method 200 can be implemented by any of the network elements 110 upon adding a new connection to the network to avoid downstream transients due to clock mode transitions. Conceptually, the function of the method 200 is to take two different clock sources, i.e. a shelf clock and a client clock, and slowly merge them relative to a new connection to make clock transients on that new connection smoother.

In operation, the method 200 initially forces a maintenance condition on a connection (step 202). This maintenance condition can include injection of an ODUk Alarm Indication Signal (AIS) on the HO to override any consequent action. Next, fabric and data path logic are provisioned for the connection (step 204). For example, assuming a mode change from a multiplexed ODTUG to a 1:1 container mapped ODUk, this step removes an ODUk rate free run and locks the ODUk-AIS line signal to the incoming ODUk from a switch fabric. The frame alignment at this point would not change. The method 200 enables a low gain/slope mode (step 206). A rate of change of the frequency (gain) of the connection can be programmable by software and set low enough to guarantee that all devices, circuits, and phase lock loops (PLLs) downstream can track the frequency change. Specifically, the connection 130 is formed based on various hardware (e.g., PLLs, digital integrated circuitry, etc.), software, and firmware at the nodes 110a, 110b, 110e, 110c. These devices do not all track frequency changes in the connection 130 the same way and significant problems can occur based on instantaneous changes in frequency. The method 200 seeks to eliminate these problems by performing a slow drift in frequency changes so subsequent devices for the connection 130 can track these frequency changes. Specifically, the method 200 drifts the line rate of the connection to the client rate or vice versa (step 208).

The egress rates can be monitored by the method 200 (step 210), and once a lock is achieved with the fabric rate (i.e., the line rate equals the client rate), the method 200 can revert gain/slope changes and remove the ODUk-AIS maintenance override (step 212). The removal of maintenance might create an OOF event as framers lock to the new Frame Alignment Signal (FAS) position (Step 214). This will be on the order of a few frames (e.g., 10-20) and framers will propagate an IAE defect to indicate this change in alignment. Finally, the method 200 enables a normal gain/slope mode from the low gain/slope mode (step 216). As described herein, the method 200 is performed by various hardware, software, and/or firmware associated with a connection at a network element (e.g., the connection 130 at the node 110a). In an exemplary embodiment, the node 110a can include OTN processing circuitry that among other things controls clocking for the connection 130. The low gain/slope mode and the normal gain/slope mode can be performed by the OTN processing circuitry. Specifically, in the low gain/slope mode, the OTN processing circuitry is configured to track between different clocks (e.g., between a local shelf clock and a client clock) slowly.

For example, assume an OTU2 connection exists and is currently set with unallocated ODTUGs, and it is desired to add a 10G client (e.g., OC-192, STM-64, etc.) therein. This will require a clock transition as the OTU2 connection is switched from ODTUG mappings to a 1:1 container mapping. The method 200 can be used on this OTU2 connection at an ingress node to smooth the clock transitions at the node thereby reducing downstream transients. The method 200 will initiate with the forced AIS with the node free running frames and not locking on the 10G client. The method 200 will connect 10G to the OTU2 connection via the switch fabric, but maintain the forced AIS. The method 200, via circuitry, software, etc., will track the clock of the 10G client, but in a very slow fashion, i.e. the low gain/slope mode, thereby allowing every downstream node to slowly adapt to the slowly changing OTU2. The forced AIS will remain until there is a convergence of the clocks between the line (i.e., the OTU2 connection) and the client (i.e., the 10G client). While the AIS remains in effect, other overhead such as General Communications Channels (GCC) are still available on the connection. Once the forced AIS is removed, a minor traffic hit occurs, but this traffic hit is bounded since there is a frequency match between the line and the client, any OOF condition is but a few of frames. The method 200 avoids LOF alarm. The method 200 can be viewed as a staged approached to reconciling clocks associated with a connection. For example, on an input frequency (i.e., 10G client into the OTU2 from the switch fabric), the frequency change is a step function, i.e. the clock of the OTU2 immediately is stepped to the clock of the 10G client. However, on an output frequency (i.e., OTU2 connection from the node), there is conditioning and slow drift to the 10G so that downstream elements can slowly adapt.

Figure 3:
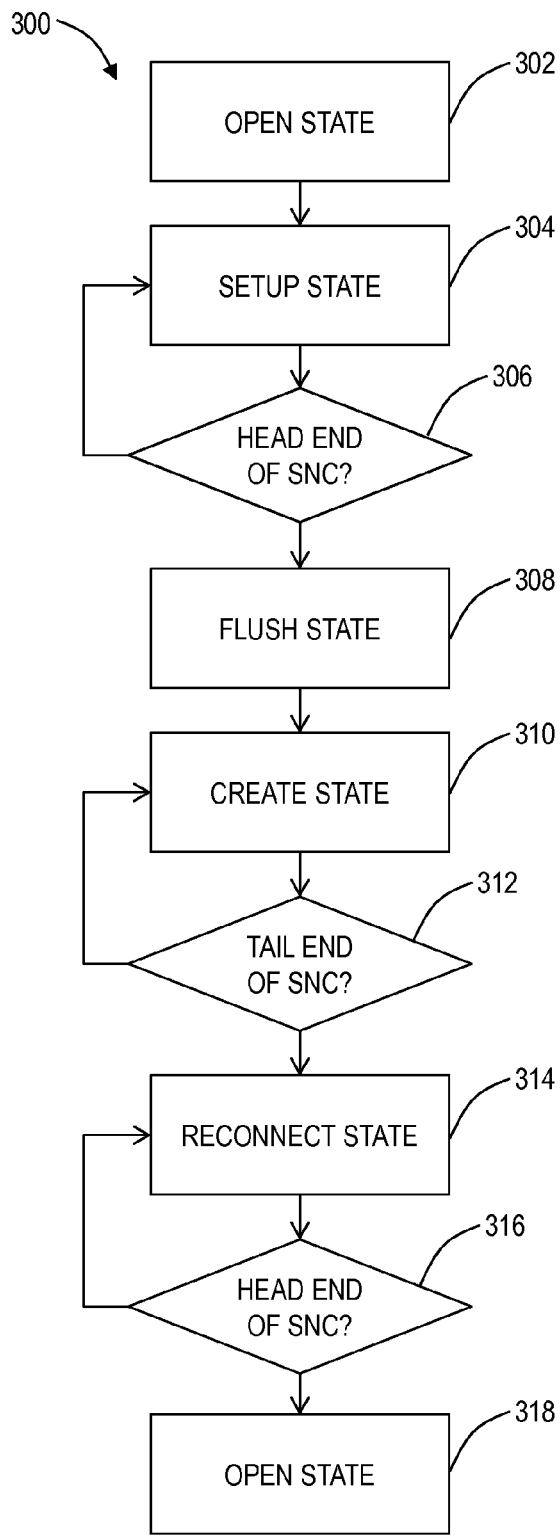
FIG. 3 is a flowchart/state diagram of a network-based method for managing the setup of ODUk connections on an end-to-end basis to prevent spurious alarms when an ODUk is added to the network.

Referring to FIG. 3, in an exemplary embodiment, a flowchart/state diagram illustrates a network-based method 300 for managing the setup of ODUk connections (e.g., high order (HO) connections) on an end-to-end basis to prevent spurious alarms when an ODUk is added to the network. Using the connection 130 as an example, the method 300 can be performed cooperatively by each of the nodes 110a, 110e, 110b, 110c to mitigate transient effects such as unwanted mesh restoration, squelching control plane overhead communications (i.e., in-band communications) during transitions, control plane retries and timeouts, etc. Note, the network-based method 300 can be used in conjunction with the network element-based method 200 or separately. The method 300 realizes during mode transitions on the connection 130 there will be frequency and frame slips that can cause LOF at the OTUk level. However, the method 300 seeks to avoid mesh restoration events and in-band communications during the transitions, and the method 300 takes a network-based approach ensuring hop-by-hop synchronization and switch closures and frequency transitions in an ordered fashion along the connection 130. Specifically, the method 300 squelches alarms and in-band communications while the transitions occur, waiting for the ordered fashion to complete.

The network-based method 300 includes various states, i.e. an open state, a setup state, a flush state, a create state, a reconnect state, and again the open state. In an exemplary embodiment, the method 300 proceeds from one end of the connection 130 to the other and back, e.g. from a tail end or destination node to a head end or originating node and back to the tail end. Further, the various states relate to the connection 130 and operations thereon at the various nodes 110a, 110b, 110e, 110c. With reference to FIG. 1, the method 300 would start at the node 110c proceed through the nodes 110b, 110e to the node 110a and then back from the node 110a through the nodes 110b, 110e to the node 110c. In process, the method 300 performs steps and functions in an ordered, sequential fashion such that cross connections are applied orderly. The method 300 approaches the mode changes for ODUk connections understanding that any change will be a shock on an OTUk line, but with a goal of minimizing the shock through an orderly process. The method 300 also assumes the control plane 140 is used on the network 100, operating as an adjacency protocol underneath the control plane 140 or integrated therein.

The method 300 begins in an open state 302 in which the connection 130 is operating with its GCC channels available and passing in-band communications for the control plane. This initial open state 302 is before the mode transition has occurred or is implemented. Upon a mode transition, the method 300 transitions to a setup state 304. The setup state 304 includes the exchange of CONNECT and SETUP messages between the nodes 110. In an exemplary embodiment, the CONNECT messages are part of the control plane and the SETUP messages are part of an adjacency protocol to the control plane. The CONNECT messages are to communicate between adjacent nodes 110 that the connection is being established whereas the SETUP messages are to communicate between adjacent nodes 110 that the method 300 is being implemented concurrently with the connection establishment. A SETUP message is transmitted by one of the nodes 110 and an acknowledgement (SETUP ACK) is sent by the other of the nodes 110 responsive to the SETUP message. At this point, the adjacent nodes 110 are freely passing in-band communications, but the nodes 110 can start to ignore events such as line down. The purpose of the SETUP/SETUP ACK messages is to set up this adjacency protocol to prepare for the mode change. The setup state 304 proceeds from a tail end node, e.g. the node 110c, to a head end node, e.g. the node 110a (state 306). This adjacency protocol also ensures all CONNECT messages are received prior to any cross connects being closed/established.

Once the SETUP/SETUP ACK messages have proceeded down the connection 130, the method 300 enters a flush state 308. The flush state 308 proceeds from head end to tail end, and similar to the setup state 304, the flush state 308 includes FLUSH messages and FLUSH ACK messages exchanged between adjacent nodes 110. Upon receipt of the FLUSH and the FLUSH ACK messages, adjacent nodes can buffer any in-band communications and consequently not transmit the in-band communications therebetween. That is, the flush state 308 is to flush out any in-band communications for buffering during the transition. After adjacent nodes perform the flush therebetween, i.e. the method includes FLUSH messages and FLUSH ACK messages, and after a certain period, cross connects are closed at the adjacent nodes 110 in a create state 310. Specifically, from the head node to the tail node, adjacent nodes exchange the FLUSH and FLUSH ACK messages, and then the nodes enter into the create state 310 where the cross connects are established. As such, the cross connects for the connection are established in an orderly process from head node to tail node in order.

Using the connection 130 as an example, assume the node 110a sends a FLUSH message to the node 110e, the node 110e responds with a FLUSH ACK, and the node 110a enters the create state 310 closing its cross connect. The node 110e sends a FLUSH message to the node 110b, the node 110b responds with a FLUSH ACK, and the node 110e enters the create state 310 closing its cross connect, etc. Despite this closure of the cross connects, in-band communications are still suppressed and buffered, and alarms are seen at the nodes 110 with the closed cross connects, but these do not propagate downstream as the nodes downstream still have their cross connects open. Once the flush state 308 and the create state 310 have propagated to the tail node (step 312), all cross connects are closed, and the tail node can enter a reconnect state 314 where RECONNECT messages can be sent from the tail node to the head node via adjacent nodes to instruct the nodes 110 to start passing alarming, fault monitoring, and in-band communications. Similar to the setup and flush messages, the RECONNECT messages can include a RECONNECT message and a RECONNECT ACK message.

At the end of the create state 310, each of the nodes 110 will have its cross connects applied. The reconnect state 314 is performed subsequently to restart alarming and in-band communications. Thus, it is guaranteed that all cross connects are applied, in an orderly manner, before reestablishing messaging. The reconnect state 314 propagates from the tail node to the head end node (step 316), and then the method 300 ends with the connection again in an open state 318. The method 300 generally avoids mesh restoration during mode transitions of a connection as well as suppression of in-band communications on the connection during the transitions. The method 300 is a network-based approach which ensures all cross connects at the nodes 110 are applied in order (as opposed to in a random fashion) and all frequency transitions are complete before alarms are passed/raised and in-band communications is reestablished. As described herein, the method 300 can be viewed as an adjacency protocol with the control plane for minimizing shocks anticipated with mode transitions.

The method 300 sets up clocks for the OTN connection 130 in a unidirectional fashion. This is illustrated in detail in FIGS. 6-10. Specifically, in FIGS. 6-10, the method 300 is shown setting up the connection 130 and its mode change from tail node 110c to the head node 110a and then from the head node 110a to the tail node 110c. The actions associated with the method 300 form a sideways U-shape in the network 100, i.e. starting at the tail node 110c and progressing to the head node 110a (one side of the "U"), at the head node 110a switching to the other leg (the bottom of the "U"), and progressing from the head node 110a to the tail node 110c (the other side of the "U"). Of course, the method 300 contemplates operation in the opposite direction as well in another exemplary embodiment, i.e., head to tail and then tail to head. This unidirectional operation of the method 300 ensures the mode change of the connection 130 is performed in an ordered fashion.

Referring to FIG. 4, in an exemplary embodiment, a block diagram illustrates an exemplary node 110A for the OTN transient management systems and methods. In an exemplary embodiment, the exemplary node 110A can be a network element that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the node 110A can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the node 110A can be any digital system with ingress and egress digital signals and switching therebetween of channels, timeslots, tributary units, etc. utilizing OTN. While the node 110A is generally shown as an optical network element, the OTN transient management systems and methods are contemplated for use with any switching fabric, network element, or network based thereon.

In an exemplary embodiment, the node 110A includes common equipment 410, one or more line modules 420, and one or more switch modules 430. The common equipment 410 can include power; a control module; operations, administration, maintenance, and provisioning (OAM&P) access; user interface ports; and the like. The common equipment 410 can connect to a management system 450 through a data communication network 460. The management system 450 can include a network management system (NMS), element management system (EMS), or the like. Additionally, the common equipment 410 can include a control plane processor configured to operate a control plane as described herein. The node 110A can include an interface 470 for communicatively coupling the common equipment 410, the line modules 420, and the switch modules 430 therebetween. For example, the interface 470 can be a backplane, mid-plane, a bus, optical or electrical connectors, or the like. The line modules 420 are configured to provide ingress and egress to the switch modules 430 and external to the node 110A. In an exemplary embodiment, the line modules 420 can form ingress and egress switches with the switch modules 430 as center stage switches for a three-stage switch, e.g. a three stage Clos switch. The line modules 420 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 420 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, and any rate in between. The line modules 420 can include wavelength division multiplexing interfaces, short reach interfaces, and the like, and can connect to other line modules 420 on remote network elements, end clients, edge routers, and the like. From a logical perspective, the line modules 420 provide ingress and egress ports to the node 110A, and each line module 420 can include one or more physical ports. The switch modules 430 are configured to switch channels, timeslots, tributary units, etc. between the line modules 420. For example, the switch modules 430 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 330 can include both Time Division Multiplexed (TDM) (i.e., circuit switching) and packet switching engines. The switch modules 430 can include redundancy as well, such as 1:1, 1:N, etc. In an exemplary embodiment, the switch modules 430 provide OTN switching.

Those of ordinary skill in the art will recognize the node 110A can include other components which are omitted for illustration purposes, and that the systems and methods described herein are contemplated for use with a plurality of different network elements with the node 110A presented as an exemplary type of network element. For example, in another exemplary embodiment, the node 110A may not include the switch modules 430, but rather have the corresponding functionality in the line modules 420 (or some equivalent) in a distributed fashion. For the node 110A, other architectures providing ingress, egress, and switching therebetween are also contemplated for the systems and methods described herein. In general, the systems and methods described herein contemplate use with any network element providing switching of OTN channels, timeslots, tributary units, etc. In various exemplary embodiments, the node 110A is configured to support the systems and methods described herein through configuration of the modules 410, 420, 430.

Figure 5:
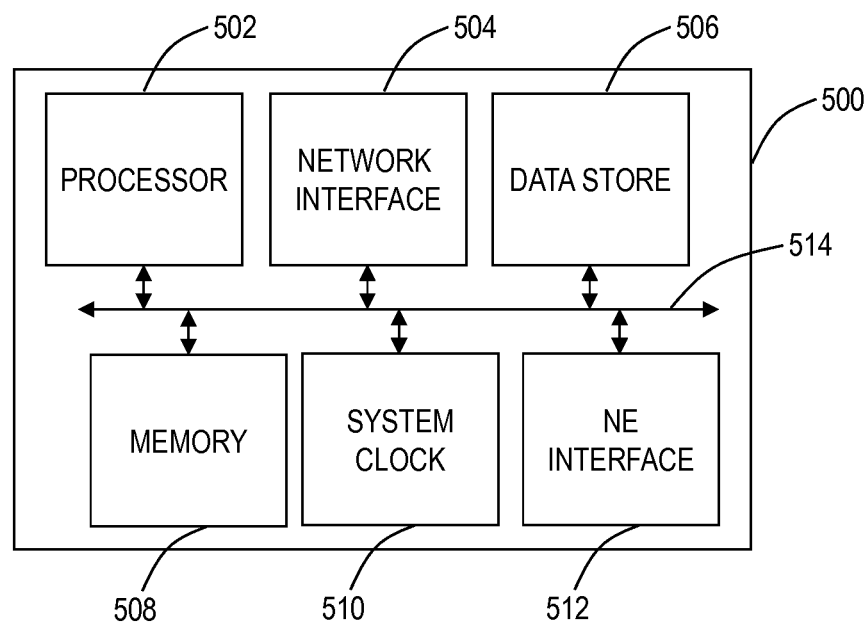
FIG. 5 is a block diagram of a control module to provide control plane processing and/or OAM&P for a node such as the node of FIG. 4.

Referring to FIG. 5, in an exemplary embodiment, a block diagram illustrates a control module 500 to provide control plane processing and/or OAM&P for a node such as the node 110A. The control module 500 can be part of common equipment, such as common equipment 410 in the node 110A. The control module 500 can include a processor 502 which is hardware device for executing software instructions such as operating the control plane. The processor 502 can be any custom made or commercially available processor, a central processing unit (CPU), an auxiliary processor among several processors associated with the control module 500, a semiconductor-based microprocessor (in the form of a microchip or chip set), or generally any device for executing software instructions. When the control module 500 is in operation, the processor 502 is configured to execute software stored within memory, to communicate data to and from the memory, and to generally control operations of the control module 500 pursuant to the software instructions. The control module 500 can also include a network interface 504, a data store 506, memory 508, a system clock 510, a network element interface 512, and the like, all of which are communicatively coupled therebetween and with the processor 502.

The network interface 504 can be used to enable the control module 500 to communicate on a network, such as to communicate control plane information to other control modules, to the management system 460, and the like. The network interface 504 can include, for example, an Ethernet card (e.g., 10BaseT, Fast Ethernet, Gigabit Ethernet) or a wireless local area network (WLAN) card (e.g., 802.11a/b/g). The network interface 504 can include address, control, and/or data connections to enable appropriate communications on the network. The data store 506 can be used to store data, such as control plane information, provisioning data, OAM&P data, etc. The data store 506 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 506 can incorporate electronic, magnetic, optical, and/or other types of storage media. The memory 508 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 508 may incorporate electronic, magnetic, optical, and/or other types of storage media. Note that the memory 508 can have a distributed architecture, where various components are situated remotely from one another, but may be accessed by the processor 502.

The system clock 510 can be the shelf clock described herein. The system clock 510 can be used to provide timing to OTN connections in one of the modes, e.g. when the OTN connections include ODTUGs or in freerun maintenance. Specifically, the system clock 510 can be communicatively coupled to the OTN connections through the line modules 410, the switch modules 420, etc. The network element interface 512 includes components for the control module 500 to communicate to other devices in a node, such as through the local interface 470. The components (502, 504, 506, 508, 510, 512) are communicatively coupled via a local interface 514. The local interface 514 and the network element interface 512 can be, for example but not limited to, one or more buses or other wired or wireless connections, as is known in the art. The local interface 514 and the network element interface 512 can have additional elements, which are omitted for simplicity, such as controllers, buffers (caches), drivers, repeaters, and receivers, among many others, to enable communications. Further, the local interface 514 and the network element interface 512 can include address, control, and/or data connections to enable appropriate communications among the aforementioned components.

In context of the OTN transient management systems and methods, the node 110A and/or the control module 500 can include hardware, software, and/or firmware to implement the various processes, algorithms, methods, techniques, etc. described herein. The control module 500 can be responsible for all control plane processing as well as performing the method 300 in establishing the adjacency protocol with the control plane. The control module 500 can also be used to implement the method 200 at a specific node, e.g. the node 110a, during mode transitions. In an exemplary embodiment, the control module 500 and/or the management system 450 can include point and click provisioning where a user simply selects ingress and egress points and an amount of bandwidth, and processes are put in place to automatically provision a connection based thereon without further user involvement. The methods 200, 300 contemplate use in this point-and-click provisioning where the connection requires an OTN mode change. For example, referring to the connection 130 in FIG. 1, a user could select the nodes 110a, 110c as the ingress/egress nodes and a bandwidth amount (e.g., 10G for an OTU2, 40G for an OTU3, 100G for an OTU4). Prior to this, the connection 130 can be set as an ODTUG and since the bandwidth amount requires 1:1 container mapping, the nodes 110a and the network 100 can implement the methods 200, 300 to mitigate the mode transition required for setting up the connection 130. These processes can be automated from the user's perspective.

Further, the control module 500 is configured to communicate to other control modules 500 in other nodes on a network. This communication may be either in-band or out-of-band. For SONET networks and similarly for SDH networks, the control module 500 can use standard or extended SONET line (or section) overhead for in-band signaling, such as the Data Communications Channels (DCC). Out-of-band signaling can use an overlaid Internet Protocol (IP) network such as, for example, User Datagram Protocol (UDP) over IP. In an exemplary embodiment, the control module 500 and the nodes 110 use an in-band signaling mechanism utilizing OTN overhead. The GCC defined by ITU-T Recommendation G.709 are in-band side channels used to carry transmission management and signaling information within Optical Transport Network elements. The GCC channels include GCC0 and GCC1/2. GCC0 are two bytes within OTUk overhead that are terminated at every 3R (Re-shaping, Re-timing, Re-amplification) point. GCC1/2 are four bytes (i.e. each of GCC1 and GCC2 include two bytes) within ODUk overhead. The GCC0, GCC1, GCC2 or GCC1+2 bytes can be used for in-band signaling or routing to carry control plane traffic. Based on the intermediate equipment's termination layer, different bytes can be used to carry control plane traffic. If the ODU layer has faults, it has been ensured not to disrupt the GCC1 and GCC2 overhead bytes and thus achieving the proper delivery control plane packets.

Figure 6:
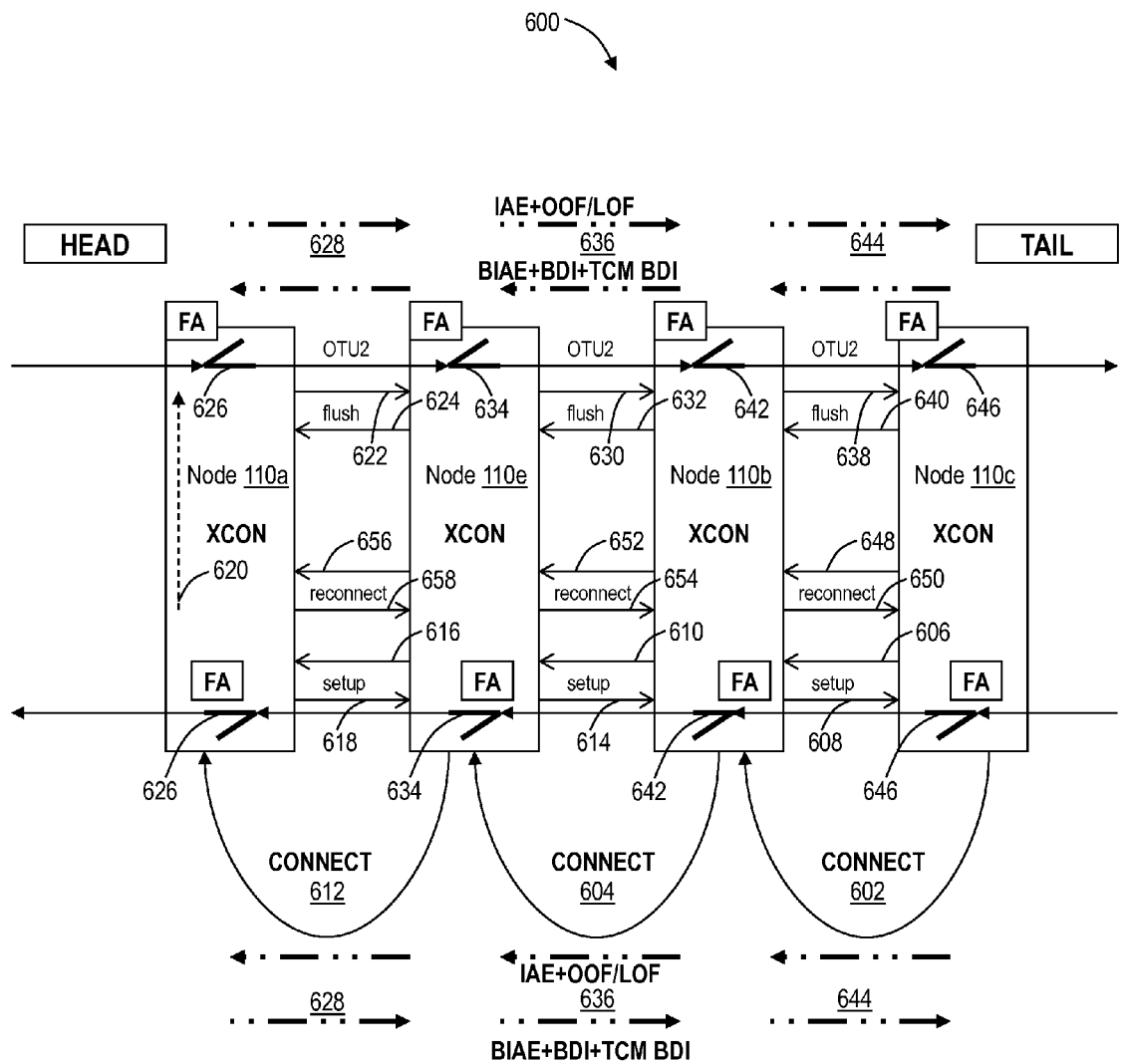
FIG. 6 is a network diagram of an exemplary operation of the method of FIG. 3 on the network of FIG. 1 with each of the nodes affected by a mode change.

Referring to FIG. 6, in an exemplary embodiment, the nodes 110a, 110e, 110b, 110c illustrate an exemplary operation 600 of the method 300. The exemplary operation 600 illustrates the four nodes 110a, 110e, 110b, 110c associated with the connection 130 and the associated communications therebetween. Also, the exemplary operation 600 assumes the connection 130 is an OTU2 between all of the nodes (of course, the connection could be other variants, e.g. OTU3, OTU4, etc., of note here is the connection 130 is the same bandwidth across all of the nodes). At the outset, there is a desired mode change on the connection 130, and the node 110c sends a CONNECT message to the node 110b (step 602). The node 110b can send a CONNECT message to the node 110e (step 604), and the node 110c sends a SETUP message to the node 110b starting the adjacency protocol (step 606). Upon receipt of the SETUP message, the node 110b sends a SETUP ACK to the node 110c (step 608) and the node 110b sends a SETUP message to the node 110e (step 610). The node 110e sends a CONNECT message to the node 110a (step 612). Note the CONNECT messages are part of the control plane whereas the SETUP messages are part of the adjacency protocol. Thus, the order may vary between the CONNECT and SETUP messages.

Upon receipt of the SETUP message, the node 110e sends a SETUP ACK to the node 110b (step 614) and the node 110e sends a SETUP message to the node 110a (step 616). The node 110a sends a SETUP ACK message to the node 110e (step 618), and now all nodes 110 have communicated through the setup state 304, and the nodes 110 will now enter the flush state 308 (step 620). The node 110a sends a FLUSH message to the node 110e (step 622). Upon receipt of the FLUSH message, the node 110e sends a FLUSH ACK message to the node 110a (step 624). Upon receipt of the FLUSH ACK message, the node 110a closes its cross connect entering the create state 310 (step 626), alarms (e.g., IAE+OOF/LOF and BIAE+BDI+TCM BDI) are now passed with the closed cross connect (step 628), and the node 110e sends a FLUSH message to the node 110b (step 630). Note, the alarms do not propagate downstream as only the cross connects at the node 110a are closed. Upon receipt of the FLUSH message, the node 110b sends a FLUSH ACK message to the node 110e (step 632). Upon receipt of the FLUSH ACK message, the node 110e closes its cross connect entering the create state 310 (step 634), alarms are now passed with the closed cross connect (step 636), and the node 110b sends a FLUSH message to the node 110c (step 638).

Upon receipt of the FLUSH message, the node 110c sends a FLUSH ACK message to the node 110b (step 640). Upon receipt of the FLUSH ACK message, the node 110b closes its cross connect entering the create state 310 (step 642), alarms are now passed with the closed cross connect (step 644), and the node 110c closes its cross connect entering the create state 310 (step 646). The node 110c now enters the reconnect state 314 and sends a RECONNECT message to the node 110b (step 648). Upon receipt of the RECONNECT message, the node 110b sends a RECONNECT ACK to the node 110c (step 650) and a RECONNECT message to the node 110e (step 652). Upon receipt of the RECONNECT message, the node 110e sends a RECONNECT ACK to the node 110b (step 654) and a RECONNECT message to the node 110a (step 656). Upon receipt of the RECONNECT message, the node 110a sends a RECONNECT ACK to the node 110e (step 658), and the exemplary operation 600 ends with the connection back in the open state 318.

Figure 7:
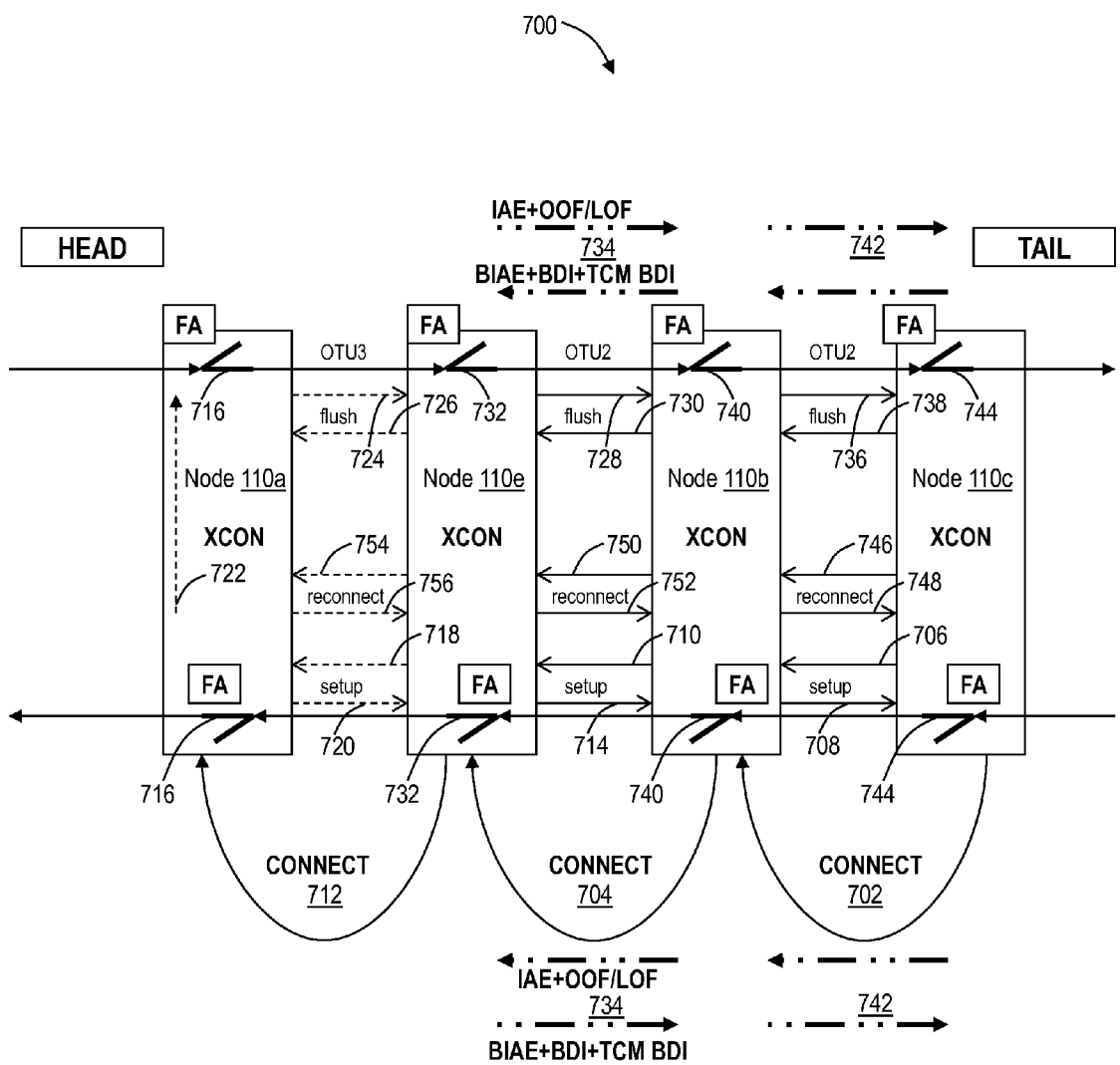
FIG. 7 is a network diagram of another exemplary operation of the method of FIG. 3 on the network of FIG. 1 with a head end node unaffected by a mode change.

Referring to FIG. 7, in an exemplary embodiment, the nodes 110a, 110e, 110b, 110c illustrate an exemplary operation 700 of the method 300. Similar to the operation 600, the exemplary operation 700 illustrates the four nodes 110a, 110e, 110b, 110c associated with the connection 130 and the associated communications therebetween. The exemplary operation 700 includes a different sized connection at the head end, i.e. the connection 130 is an OTU2 between the nodes 110*e*, 110*b*, 110*c* and an OTU3 between the nodes 110*a*, 110*e* (of course, this could be other variants). The operation 700 does not need the method 300 to operate between the nodes 110*a*, 110*e*, i.e. there is no mode transition here since a 10G client can be placed in the OTU3 without requiring a mode change (however, the 10G client requires the OTU2 to be 1:1 container mapped requiring a mode change from ODTUG). At the outset, there is a desired mode change on the connection 130, and the node 110*c* sends a CONNECT message to the node 110*b* (step 702). The node 110*b* can send a CONNECT message to the node 110*e* (step 704), and the node 110*c* sends a SETUP message to the node 110*b* starting the adjacency protocol (step 706). Upon receipt of the SETUP message, the node 110*b* sends a SETUP ACK to the node 110*c* (step 708) and the node 110*b* sends a SETUP message to the node 110*e* (step 710). The node 110*e* sends a CONNECT message to the node 110*a* (step 712). Note the CONNECT messages are part of the control plane whereas the SETUP messages are part of the adjacency protocol. Thus, the order may vary between the CONNECT and SETUP messages.

Upon receipt of the SETUP message, the node 110*e* sends a SETUP ACK to the node 110*b* (step 714). Upon receipt of the CONNECT message, the node 110*a* can apply its cross connect without delay (step 716). This is because the node 110*a* is not going to experience a transient because the connection can fit into an ODTUG on the OTU3, i.e. an ODU2 can be carried in an OTU3 without changing the clock of the OTU3 (the node 110*a* can continue to shelf clock time). Note, no alarms are passed upon closure of the cross connect at the node 110*a* as there are no transients. In any event, the node 110*e* can send a SETUP message to the node 110*a* (step 718), and the node 110*a* can send a SETUP ACK message in response (step 720). Despite the fact the node 110*a* does not need to implement the method 300 to mitigate transients, the node 110*a* can be configured to support the adjacency protocol along with the nodes 110*e*, 110*b*, 110*c*. The nodes 110 will now enter the flush state 308 (step 722). The node 110*a* sends a FLUSH message to the node 110*e* (step 724). Upon receipt of the FLUSH message, the node 110*e* sends a FLUSH ACK message to the node 110*a* (step 726). The node 110*e* sends a FLUSH message to the node 110*b* (step 728). Upon receipt of the FLUSH message, the node 110*b* sends a FLUSH ACK message to the node 110*e* (step 730). Upon receipt of the FLUSH ACK message, the node 110*e* closes its cross connect entering the create state 310 (step 732), alarms are now passed with the closed cross connect (step 734), and the node 110*b* sends a FLUSH message to the node 110*c* (step 736).

Upon receipt of the FLUSH message, the node 110*c* sends a FLUSH ACK message to the node 110*b* (step 738). Upon receipt of the FLUSH ACK message, the node 110*b* closes its cross connect entering the create state 310 (step 740), alarms are now passed with the closed cross connect (step 742), and the node 110*c* closes its cross connect entering the create state 310 (step 744). The node 110*c* now enters the reconnect state 314 and sends a RECONNECT message to the node 110*b* (step 746). Upon receipt of the RECONNECT message, the node 110*b* sends a RECONNECT ACK to the node 110*c* (step 748) and a RECONNECT message to the node 110*e* (step 750). Upon receipt of the RECONNECT message, the node 110*e* sends a RECONNECT ACK to the node 110*b* (step 752) and a RECONNECT message to the node 110*a* (step 754). Upon receipt of the RECONNECT message, the node 110*a* sends a RECONNECT ACK to the node 110*e* (step 756), and the exemplary operation 700 ends with the connection back in the open state 318.

Figure 8:
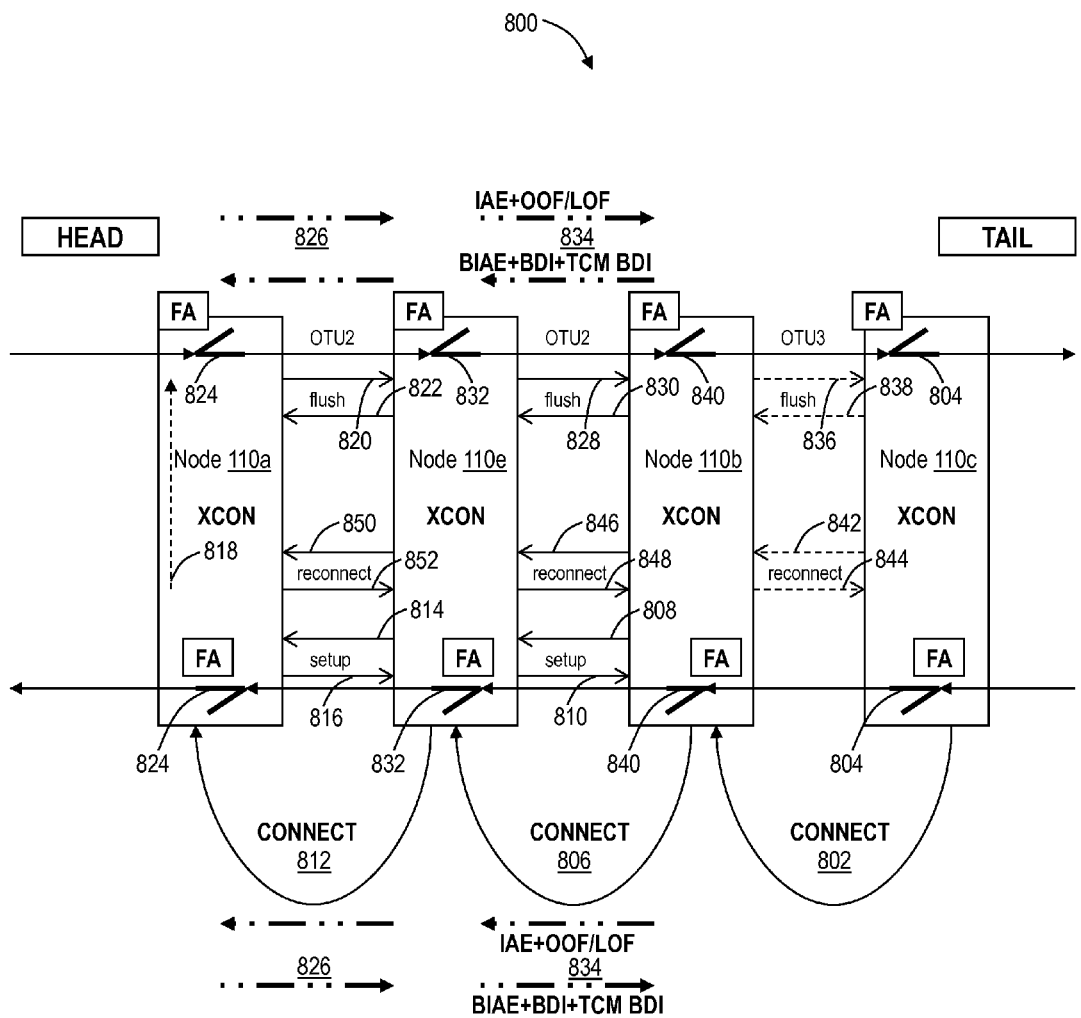
FIG. 8 is a network diagram of another exemplary operation of the method of FIG. 3 on the network of FIG. 1 with a tail end node unaffected by a mode change.

Referring to FIG. 8, in an exemplary embodiment, the nodes 110*a*, 110*e*, 110*b*, 110*c* illustrate an exemplary operation 800 of the method 300. Similar to the operations 600, 700, the exemplary operation 800 illustrates the four nodes 110*a*, 110*e*, 110*b*, 110*c* associated with the connection 130 and the associated communications therebetween. However, the exemplary operation 800 includes a different sized connection at the tail end, i.e. the connection 130 is an OTU2 between the nodes 110*a*, 110*e*, 110*b* and an OTU3 between the nodes 110*b*, 110*c* (of course, this could be other variants). The operation 800 does not need the method 300 to operate between the nodes 110*c*, 110*b*, i.e. there is no mode transition here since a 10G client can be placed in the OTU3 without requiring a mode change (however, the 10G client requires the OTU2 to be 1:1 container mapped requiring a mode change from ODTUG). At the outset, there is a desired mode change on the connection 130, and the node 110*c* sends a CONNECT message to the node 110*b* (step 802). The node 110*c* can apply its cross connect without delay (step 804). This is because the node 110*c* is not going to experience a transient because the connection can fit into an ODTUG on the OTU3, i.e. an OTU2 can be carried in an OTU3 without changing the clock of the OTU3 (the node 110*a* can continue to shelf clock time). Note, no alarms are passed upon closure of the cross connect at the node 110*c* as there are no transients. Next, the node 110*b* sends a CONNECT message to the node 110*e* (step 806), and the node 110*b* sends a SETUP message to the node 110*e* (step 808).

Upon receipt of the SETUP message, the node 110*e* sends a SETUP ACK to the node 110*b* (step 810), the node 110*e* sends a CONNECT message to the node 110*a* (step 812), and the node 110*e* send a SETUP message to the node 110*a* (step 814). Note the CONNECT messages are part of the control plane whereas the SETUP messages are part of the adjacency protocol. Thus, the order may vary between the CONNECT and SETUP messages. Upon receipt of the SETUP message, the node 110*a* can send a SETUP ACK message in response (step 816). The nodes 110 will now enter the flush state 308 (step 818). The node 110*a* sends a FLUSH message to the node 110*e* (step 820). Upon receipt of the FLUSH message, the node 110*e* sends a FLUSH ACK message to the node 110*a* (step 822). Upon receipt of the FLUSH ACK message, the node 110*a* closes its cross connect entering the create state 310 (step 824), and alarms are now passed with the closed cross connect (step 826). The node 110*e* sends a FLUSH message to the node 110*b* (step 828). Upon receipt of the FLUSH message, the node 110*b* sends a FLUSH ACK message to the node 110*e* (step 830). Upon receipt of the FLUSH ACK message, the node 110*e* closes its cross connect entering the create state 310 (step 832), and alarms are now passed with the closed cross connect (step 834).

The node 110*b* sends a FLUSH message to the node 110*c* (step 836). Note, the node 110*c* does not need to perform transient management as its OTU3 will not experience a mode change to support an ODU2 from the OTU2. In any event, the node 110*c* can participate in the protocol receiving the FLUSH message and sending a FLUSH ACK message to the node 110*b* (step 838). Specifically, while not needed to participate in the adjacency protocol, the node 110*c* can respond to externally initiated messages in the adjacency protocol. Upon receipt of the FLUSH ACK message, the node 110*b* closes its cross connect entering the create state 310 (step 840). Next, the node 110*c* can send a RECONNECT message to the node 110*b* (step 842). Upon receipt of the RECONNECT message, the node 110*b* sends a RECONNECT ACK to the node 110*c* (step 844) and a RECONNECT message to the node 110*e* (step 846). Upon receipt of the RECONNECT message, the node 110*e* sends a RECONNECT ACK to the node 110*b* (step 848) and a RECONNECT message to the node 110*a* (step 850). Upon receipt of the RECONNECT message, the node 110*a* sends a RECONNECT ACK to the node 110*e* (step 852), and the exemplary operation 800 ends with the connection back in the open state 318.

Figure 9:
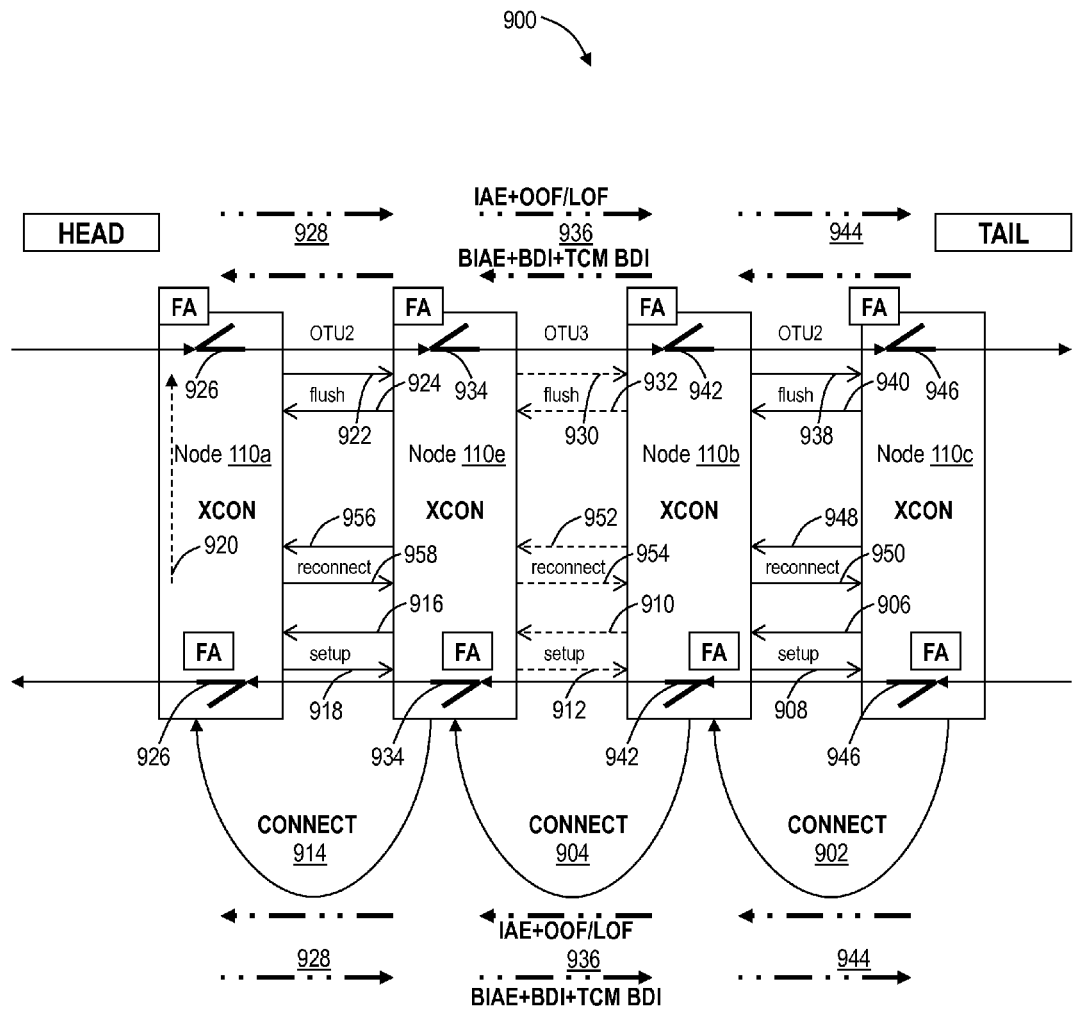
FIG. 9 is a network diagram of another exemplary operation of the method of FIG. 3 on the network of FIG. 1 with an intermediate node unaffected by a mode change.

Referring to FIG. 9, in an exemplary embodiment, the nodes 110*a*, 110*e*, 110*b*, 110*c* illustrate an exemplary operation 900 of the method 300. Similar to the operations 600, 700, 800, the exemplary operation 900 illustrates the four nodes 110*a*, 110*e*, 110*b*, 110*c* associated with the connection 130 and the associated communications therebetween. However, the exemplary operation 900 includes a different sized connection at an intermediate point, i.e. the connection 130 is an OTU2 between the nodes 110*a*, 110*e* and the nodes 110*b*, 110*c* and an OTU3 between the nodes 110*e*, 110*b* (of course, this could be other variants). The operation 800 does not need the method 300 to operate between the nodes 110*e*, 110*b*, i.e. there is no mode transition here since a 10G client can be placed in the OTU3 without requiring a mode change (however, the 10G client requires the OTU2 to be 1:1 container mapped requiring a mode change from ODTUG). At the outset, there is a desired mode change on the connection 130, and the node 110*c* sends a CONNECT message to the node 110*b* (step 902) and the node 110*b* sends a CONNECT message to the node 110*e* (step 904). The node 110*c* sends a SETUP message to the node 110*b* starting the adjacency protocol (step 906). Upon receipt of the SETUP message, the node 110*b* sends a SETUP ACK to the node 110*c* (step 908), and the node 110*b* sends a SETUP message to the node 110*e* (step 910). Note, the nodes 110*b*, 110*e* do not need to perform transient management, but can still participate in the adjacency protocol message exchanges. Upon receipt of the SETUP message, the node 110*e* sends a SETUP ACK to the node 110*b* (step 912). The node 110*e* sends a CONNECT message to the node 110*a* (step 914). Note the CONNECT messages are part of the control plane whereas the SETUP messages are part of the adjacency protocol. Thus, the order may vary between the CONNECT and SETUP messages.

The node 110*e* sends a SETUP message to the node 110*a* (step 916). Upon receipt of the SETUP message, the node 110*a* can send a SETUP ACK message in response (step 918). The nodes 110 will now enter the flush state 308 (step 920). The node 110*a* sends a FLUSH message to the node 110*e* (step 922). Upon receipt of the FLUSH message, the node 110*e* sends a FLUSH ACK message to the node 110*a* (step 924). Upon receipt of the FLUSH ACK message, the node 110*a* closes its cross connect entering the create state 310 (step 926), and alarms are now passed with the closed cross connect (step 928). The node 110*e* sends a FLUSH message to the node 110*b* (step 930). Upon receipt of the FLUSH message, the node 110*b* sends a FLUSH ACK message to the node 110*e* (step 932). Upon receipt of the FLUSH ACK message, the node 110*e* closes its cross connect entering the create state 310 (step 934), and alarms are now passed with the closed cross connect (step 936). The node 110*b* sends a FLUSH message to the node 110*c* (step 938). Upon receipt of the FLUSH message, the node 110*c* sends a FLUSH ACK message to the node 110*b* (step 940). Upon receipt of the FLUSH ACK message, the node 110*b* closes its cross connect entering the create state 310 (step 942), and alarms are now passed with the closed cross connect (step 944). The node 110*c* closes its cross connect entering the create state 310 (step 946).

Next, the node 110*c* can send a RECONNECT message to the node 110*b* (step 948). Upon receipt of the RECONNECT message, the node 110*b* sends a RECONNECT ACK to the node 110*c* (step 950) and a RECONNECT message to the node 110*e* (step 952). Upon receipt of the RECONNECT message, the node 110*e* sends a RECONNECT ACK to the node 110*b* (step 954) and a RECONNECT message to the node 110*a* (step 956). Upon receipt of the RECONNECT message, the node 110*a* sends a RECONNECT ACK to the node 110*e* (step 958), and the exemplary operation 900 ends with the connection back in the open state 318. Note, the node 110*e*, 110*b* do not need to provide transient management over the OTU3, but do participate anyway in the adjacency protocol and the associated actions because these nodes 110*e*, 110*b* are intermediate nodes for the connection 130 (as contrasted by the nodes 110*a*, 110*c* as head and tail nodes in the operations 700, 800).

Figure 10:
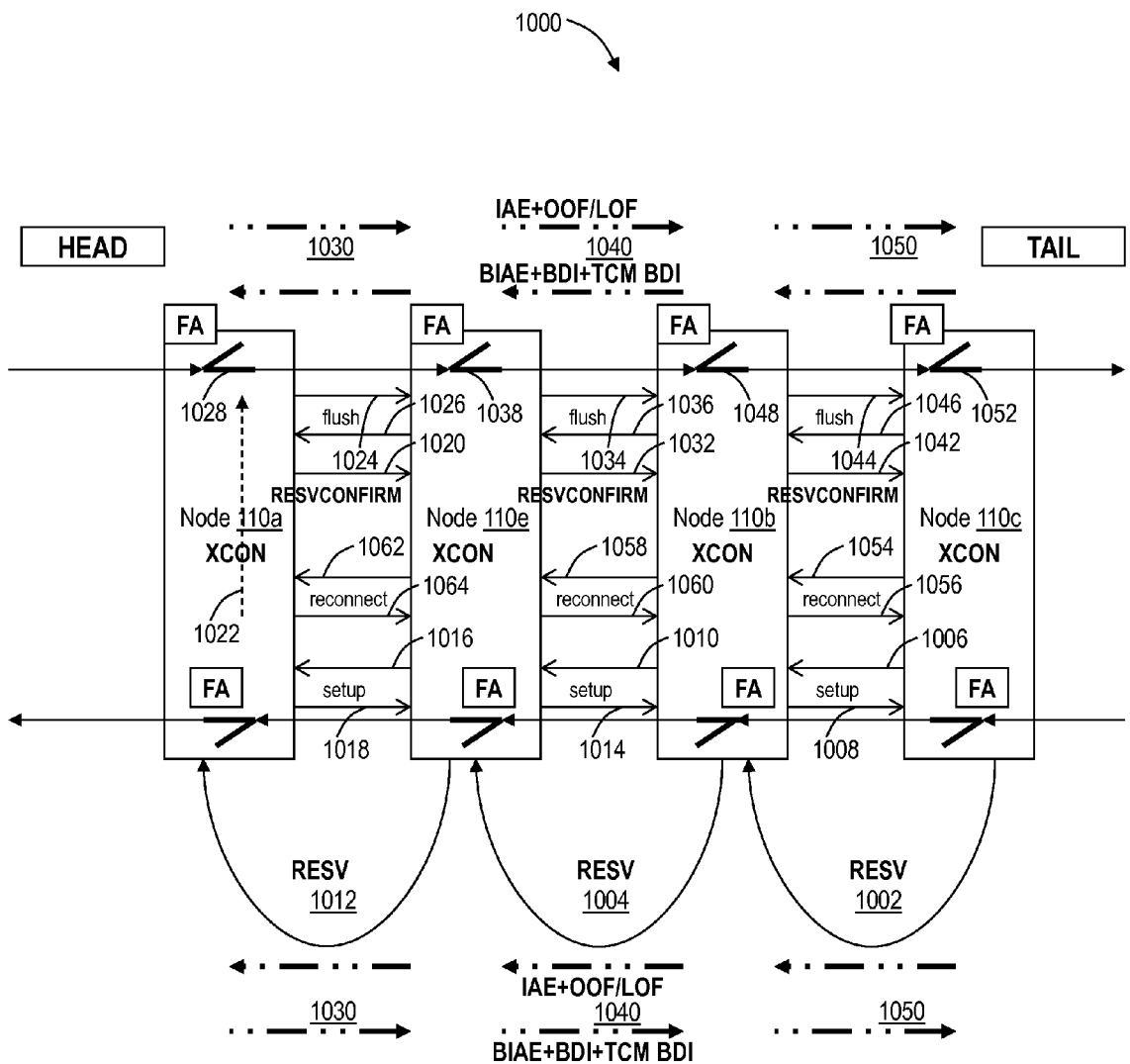
FIG. 10 is a network diagram of another exemplary operation of the method of FIG. 3 on the network of FIG. 1 with a GMPLS adaptation.

Referring to FIG. 10, in an exemplary embodiment, the nodes 110*a*, 110*e*, 110*b*, 110*c* illustrate an exemplary operation 1000 of the method 300 with GMPLS adaptations. The exemplary operation 1000 illustrates the four nodes 110*a*, 110*e*, 110*b*, 110*c* associated with the connection 130 and the associated communications there between. The exemplary operation 1000 is similar to the exemplary operation 600 of FIG. 6 showing a GMPLS version of the method 300. At the outset, there is a desired mode change on the connection 130, and the node 110*c* sends a RESV message to the node 110*b* (step 1002). The node 110*b* can send a RESV message to the node 110*e* (step 1004), and the node 110*c* sends a SETUP message to the node 110*b* starting the adjacency protocol (step 1006). Upon receipt of the SETUP message, the node 110*b* sends a SETUP ACK to the node 110*c* (step 1008) and the node 110*b* sends a SETUP message to the node 110*e* (step 1010). The node 110*e* sends a RESV message to the node 110*a* (step 1012). Note the RESV messages are part of the control plane (e.g., GMPLS) whereas the SETUP messages are part of the adjacency protocol. Thus, the order may vary between the RESV and SETUP messages.

Upon receipt of the SETUP message, the node 110*e* sends a SETUP ACK to the node 110*b* (step 1014) and the node 110*e* sends a SETUP message to the node 110*a* (step 1016). The node 110*a* sends a SETUP ACK message to the node 110*e* (step 1018), and the node 110*a* sends a RESV CONFIRM message to the node 110*e* (step 1022). All nodes 110 have communicated through the setup state 304, and the nodes 110 will now enter the flush state 308 (step 1022). The node 110*a* sends a FLUSH message to the node 110*e* (step 1024). Upon receipt of the FLUSH message, the node 110*e* sends a FLUSH ACK message to the node 110*a* (step 1026). Upon receipt of the FLUSH ACK message, the node 110*a* closes its cross connect entering the create state 310 (step 1028), alarms (e.g., IAE+OOF/LOF and BIAE+BDI+TCM BDI) are now passed with the closed cross connect (step 1030), and the node 110*e* sends a RESV CONFIRM message to the node 110*b* (step 1032). Note, the alarms do not propagate downstream as only the cross connects at the node 110*a* are closed. The node 110*e* sends a FLUSH message to the node 110*b* (step 1034). Upon receipt of the FLUSH message, the node 110*b* sends a FLUSH ACK message to the node 110*e* (step 1036).

Upon receipt of the FLUSH ACK message, the node 110*e* closes its cross connect entering the create state 310 (step 1038), alarms are now passed with the closed cross connect (step 1040), and the node 110*b* sends a RESV CONFIRM message to the node 110*c* (step 1042). The node 110*b* sends a FLUSH message to the node 110*c* (step 1044). Upon receipt of the FLUSH message, the node 110*c* sends a FLUSH ACK message to the node 110*b* (step 1046). Upon receipt of the FLUSH ACK message, the node 110*b* closes its cross connect entering the create state 310 (step 1048), alarms are now passed with the closed cross connect (step 1050), and the node 110*c* closes its cross connect entering the create state 310 (step 1052). The node 110*c* now enters the reconnect state 314 and sends a RECONNECT message to the node 110*b* (step 1054). Upon receipt of the RECONNECT message, the node 110*b* sends a RECONNECT ACK to the node 110*c* (step 1056) and a RECONNECT message to the node 110*e* (step 1058). Upon receipt of the RECONNECT message, the node 110*e* sends a RECONNECT ACK to the node 110*b* (step 1060) and a RECONNECT message to the node 110*a* (step 1062). Upon receipt of the RECONNECT message, the node 110*a* sends a RECONNECT ACK to the node 110*e* (step 1064), and the exemplary operation 1000 ends with the connection back in the open state 318.

As illustrated in FIGS. 6, 7, 8, 9, and 10, mode changes can affect the entire connection and each node therebetween (FIG. 6) or portions of the connection and a subset of the nodes involved in the connection (FIGS. 7, 8, and 9). The adjacency protocol can be configured to operate at all node involved in the connection regardless of whether a particular node requires transient mitigation. In this way, the adjacency protocol can exchange the messages between all the nodes with the individual nodes determining whether or not it is necessary to take the actions described herein to mitigate transients. Advantageously, through this adjacency protocol, a mode change can occur, end-to-end, with the network and the associated nodes managing the transition such that the transient is reduced by orderly closing cross connects and preventing signaling until the transition occurs. This allows varying ODUk rates to be transported across a switched OTN network without numerous alarms, protection events, loss of signaling, etc. during mode changes.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An Optical Transport Network (OTN) transient management method, comprising:
   operating an OTN connection comprising a plurality of ports and circuitry configured to perform OTN switching between the plurality of ports in a first mode in a network, wherein the OTN connection traverses at least two nodes in the network;
   requesting a change in the OTN connection to a second mode which will cause a network transient, wherein the change comprises a timing change on the OTN connection affecting the at least two nodes; and
   performing transient management using a transient management algorithm operating on the at the at least two nodes to mitigate the network transient, wherein the transient management prevents spurious alarms due to the change between the first mode and the second mode.

2. The OTN transient management method of claim 1, further comprising:
   performing transient management at an ingress node of the at least two nodes comprising slowing adapting timing changes between the first mode and the second mode.

3. The OTN transient management method of claim 2, wherein the performing transient management at the ingress node comprises:
   subsequent to the requesting the change, forcing a maintenance condition on the OTN connection;
   provisioning the OTN connection in hardware while limiting a frequency change rate on an egress of the OTN connection;
   drifting a frequency of the OTN connection from a frequency associated with the first mode to a frequency associated with the second mode;
   removing the maintenance condition when the frequency of the OTN connection matches the frequency associated with the second mode; and
   aligning to client framing.

4. The OTN transient management method of claim 2, further comprising:
   performing transient management at each of the at least two nodes through an adjacency protocol therebetween in addition to performing transient management at the ingress node.

5. The OTN transient management method of claim 4, wherein the performing transient management at each of the at least two nodes comprises:
   entering a setup state from a tail node of the at least two nodes to a head node of the at least two nodes;
   performing flushing from the head node to the tail node, wherein the flushing comprises buffering in-band communications;
   creating cross connects from the head node to the tail node in an orderly fashion subsequent to the flushing between adjacent nodes; and
   reconnecting from the tail node to the head node.

6. The OTN transient management method of claim 4, wherein the adjacency protocol provides an orderly closing of cross connects for the OTN connection across the at least two nodes and inhibits alarming and in-band communications during the change.

7. The OTN transient management method of claim 1, further comprising:
   performing transient management at each of the at least two nodes through an adjacency protocol therebetween.

8. The OTN transient management method of claim 7, further comprising:
   performing transient management at an ingress node of the at least two nodes in addition to the adjacency protocol, wherein the transient management at the ingress node comprises slowing adapting timing changes between the first mode and the second mode.

9. The OTN transient management method of claim 8, wherein the performing transient management at the ingress node comprises:
   subsequent to the requesting the change, forcing a maintenance condition on the OTN connection;
   provisioning the OTN connection in hardware while limiting a frequency change rate on an egress of the OTN connection;
   drifting a frequency of the OTN connection from a frequency associated with the first mode to a frequency associated with the second mode; and
   removing the maintenance condition when the frequency of the OTN connection matches the frequency associated with the second mode.

10. The OTN transient management method of claim 7, wherein the adjacency protocol provides an orderly closing of cross connects for the OTN connection across the at least two nodes and inhibits alarming and in-band communications during the change.

11. The OTN transient management method of claim 7, wherein the performing transient management at each of the at least two nodes comprises:
  entering a setup state from a tail node of the at least two nodes to a head node of the at least two nodes;
  performing flushing from the head node to the tail node, wherein the flushing comprises buffering in-band communications;
  creating cross connects from the head node to the tail node in an orderly fashion subsequent to the flushing between adjacent nodes; and
  reconnecting from the tail node to the head node.

12. The OTN transient management method of claim 1, further comprising:
  performing transient management at an ingress node of the at least two nodes comprising steps of:
    subsequent to the requesting the change, forcing a maintenance condition on the OTN connection;
    provisioning the OTN connection in hardware while limiting a frequency change rate on an egress of the OTN connection;
    drifting a frequency of the OTN connection from a frequency associated with the first mode to a frequency associated with the second mode; and
    removing the maintenance condition when the frequency of the OTN connection matches the frequency associated with the second mode.

13. The OTN transient management method of claim 1, further comprising:
  performing transient management at each of the at least two nodes comprising steps of:
    entering a setup state from a tail node of the at least two nodes to a head node of the at least two nodes;
    performing flushing from the head node to the tail node, wherein the flushing comprises buffering in-band communications;
    creating cross connects from the head node to the tail node in an orderly fashion subsequent to the flushing between adjacent nodes; and
    reconnecting from the tail node to the head node.

14. The OTN transient management method of claim 13, wherein the OTN connection does not experience the timing change between the tail node and an adjacent node, and the method further comprising:
  participating in the adjacency protocol by the tail node for the flushing and the reconnecting; and
  immediately creating cross connects at the tail node.

15. The OTN transient management method of claim 13, wherein the OTN connection does not experience the timing change between the head node and an adjacent node, and the method further comprising:
  participating in the adjacency protocol by the tail node for the entering the setup state, the flushing, and the reconnecting; and
  immediately creating cross connects at the head node upon receipt of a connect message.

16. The OTN transient management method of claim 13, wherein the performing transient management at each of the at least two nodes comprises an adjacency protocol used in combination with a control plane.

17. An Optical Transport Network (OTN) node, comprising:
  a plurality of ports;
  circuitry configured to perform OTN switching between the plurality of ports;
  a local clock;
  an OTN connection traversing the plurality of ports and the circuitry, wherein the OTN connection is configured in a first mode comprising a first timing source; and
  a transient management algorithm configured to mitigate transients associated with switching the OTN connection from the first mode to a second mode comprising a second timing source;
  wherein the local clock comprises one of the first timing source and the second timing source.

18. The Optical Transport Network (OTN) node of claim 17, wherein the local clock comprises the first timing source and the second timing source comprises line timing from a client on one of the plurality of ports.

19. The Optical Transport Network (OTN) node of claim 17, wherein the transient management algorithm comprises at least one of slowing adapting timing changes between the first timing source and the second timing source and an adjacency protocol between the node and other nodes associated with OTN connection, wherein the adjacency protocol provides an orderly creation of cross connections for the OTN connection.

20. An Optical Transport Network (OTN) network, comprising:
  a plurality of nodes interconnected therebetween;
  an OTN connection traversing at least two nodes of the plurality of nodes, wherein the OTN connection is configured in a first mode comprising a first timing source; and
  a transient management algorithm configured to mitigate transients associated with switching the OTN connection from the first mode to a second mode comprising a second timing source;
  wherein the transient management algorithm comprises at least one of slowing adapting timing changes between the first timing source and the second timing source at one of the at least two nodes and an adjacency protocol between each of the at least two nodes, wherein the adjacency protocol provides an orderly creation of cross connections for the OTN connection.

* * * * *